July 26, 1949.  C. E. TORSCH  2,477,557
POWER CONSERVATION SYSTEM
Filed Aug. 11, 1945
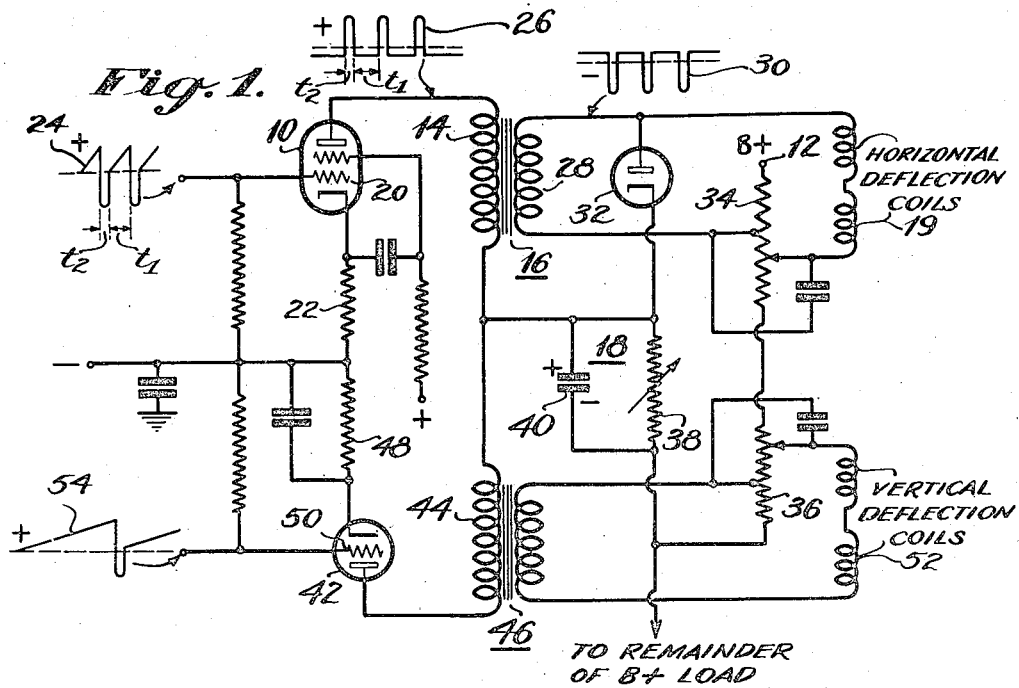
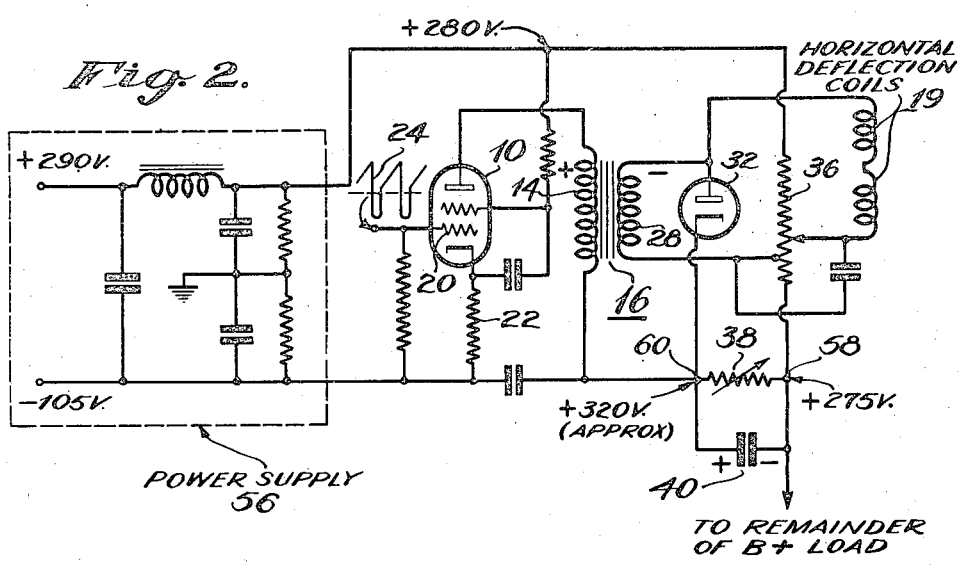
INVENTOR
CHARLES E. TORSCH
BY H. J. Grover.
ATTORNEY Patented July 26, 1949

2,477,557

UNITED STATES PATENT OFFICE 2,477,557

POWER CONSERVATION SYSTEM

Charles Edward Torsch, Lancaster Township, Lancaster County, Pa., assignor to Radio Corporation of America, a corporation of Delaware Application August 11, 1945, Serial No. 610,368

9 Claims. (Cl. 315—27)

The present invention relates to cathode ray beam deflection circuits, especially of the type employed in television transmitting and receiving systems. More particularly, the invention relates to means for reclaiming a portion of the cyclic reactive energy which is developed in such circuits, and which is usually dissipated without being gainfully utilized.

The problem of raising the efficiency of utilization of the input power in a reactive load circuit, especially in a line or horizontal cathode ray beam deflection circuit of the type used in television systems, has been considered in a copending application of Otto H. Schade, Serial No. 593,161, filed May 11, 1945. The solution there proposed includes rectification of the cyclic reactive energy developed in the load circuit, and the storing of this rectified energy to establish a relatively steady D.-C. potential. The steady D.-C. potential thus established is, in one modification, applied in series with the source of D.-C. input voltage to raise the amount of useful power which is made available in the load circuit.

In a power conservation, or "boosting," system such as outlined above, the efficiency of the circuit depends upon the percentage of the D.-C. power input which can be recovered and stored for the purpose of recirculation since, obviously, the greater the value of the recovered energy, the higher will be the ratio of power output to power input. It is with the raising of this circuit efficiency ratio that the present invention is primarily concerned.

In the copending Schade application, Serial No. 593,161, above referred to, the cyclic reactive energy developed in the load circuit is rectified and applied to an energy storage device to build up a relatively smooth D.-C. potential thereon. The rectifying means, which in the Schade disclosure is a controlled inverter tube or triode damper, is connected in series with the energy storage device, which may be a condenser. The series combination of triode and condenser is then shunted across the reactive portion of the load circuit, such as the cathode ray beam deflection coil.

The voltage developed across the inductive portion of the output circuit, such as the cathode ray beam deflection coil in the example cited, may be represented mathematically as $$L \cdot \frac{di}{dt}$$

where L represents the inductance of the coil and $$\frac{di}{dt}$$

is the differential representing the rate of change of current flow through the coil with respect to time. This inductive voltage $$L \cdot \frac{di}{dt}$$

is approximately equal to the sum of the condenser voltage, the triode damper voltage drop, and the voltage drop due to the distributed circuit resistance.

In order to develop a maximum condenser voltage, or, in other words, in order to reclaim a maximum amount of the cyclic reactive energy, the other two factors present, namely, the triode damper voltage drop and the voltage drop due to the distributed circuit resistance, must be kept at a minimum. Since the latter is a relatively fixed quantity, only the triode damper voltage drop normally would be subject to change. However, this voltage drop is also of a relatively constant value for controlled inverter tubes designed to withstand the high peak voltages which are developed in television scanning systems.

The present invention contemplates a raising of the voltage developed on the condenser element of "booster" circuits of the type discussed above by replacing the triode damper tube with a rectifier across which there is a smaller voltage drop. This requirement is satisfied by the use, for example, of a rectifier tube such as a diode. This is true because the internal resistance of a diode is normally considerably less than that of a grid-controlled tube. Furthermore, not only does a two-element tube permit the recovery of a maximum amount of power, which is a highly important factor, but due to the fact that diodes having satisfactory operating characteristics are less expensive to manufacture than any grid-controlled tube which has proved practicable, such a procedure reduces the cost of the television equipment.

In addition to the above, the present invention further contemplates the use of energy reclaimed in the manner set forth not only to result in greater scanning power for the horizontal, or line, deflection coils, but also to increase the vertical, or field, scanning output. This may be accomplished, for example, by feeding the reclaimed energy to the anodes of both the horizontal and vertical power tubes in series with the D.-C. input voltage. As a consequence, improved operation is achieved not only for the line deflection circuit, but also for the field deflection circuit.

One object of the present invention, therefore, is to provide means for reclaiming a maximum percentage of the power normally wasted in cyclic reactive load circuits.

Another object of the invention is to provide a cathode ray beam deflection circuit of the electromagnetic type in which the reactive energy developed during the retrace periods of the cathode ray beam is rectified and stored to develop a relatively steady D.-C. potential, and which further includes means for minimizing the resistance of the rectifier element of the circuit so as to increase the amount of power which can be stored and hence made available for recirculation through the deflection coils.

A further object of the invention is to provide a low-resistance rectifier element for use in a circuit of the type above set forth which is efficient in operation and relatively inexpensive in cost.

A still further object of the invention is to provide, in a television system employing a cathode ray tube having an electromagnetically deflected cathode ray scanning beam, means for "boosting" the D.-C. input power to the line deflection circuit, and further means for making this "boosted" power available to improve the operation of the field deflection circuit as well.

Other objects and advantages will be apparent from the following description of preferred forms of the invention and from the drawings, in which:

Fig. 1 is a circuit diagram illustrating a preferred form of the present invention; and Fig. 2 illustrates a modification of the circuit of Fig. 1.

Referring first to Fig. 1, there is shown a cathode ray beam deflection circuit as used in television transmitting and receiving systems, in which a cathode ray scanning beam is caused to scan each line of an image raster at a relatively slow rate, followed by a rapid snap-back, or retrace, of the cathode ray beam to a point at the beginning of the next scanning line. The illustrated circuit includes a horizontal or line power output tube 10 which may, for example, be of the type known as the 807, and which includes a cathode, a control electrode, a screen electrode, and an anode. The anode of tube 10 is connected to the positive terminal 12 of a suitable source of potential (not shown) through the primary winding 14 of a step-down coupling transformer 16 in series with a parallel resistor-condenser combination 18. Power tube 10 is adapted to supply cyclically varying current, in a manner to be later described, through transformer 16 to a pair of horizontal or line deflection coils 19.

A negative bias is produced on the control electrode 20 of power tube 10 during operation of the system by means of a cathode-biasing resistor 22. Since the screen current of power tube 10 also flows through resistor 22, the negative bias produced on the control electrode 20 is proportional to the combined screen grid and plate current, and hence varies during each scanning cycle.

Voltage variations, the waveform of which may be such as indicated by the reference character 24, are applied to the control electrode 20 of tube 10. These voltage variations 24 have linearly rising positive portions during the cathode ray beam scanning intervals, denoted by the symbol $t_1$, followed by sharp negative excursions during retrace intervals, denoted by the symbol $t_2$. As a result of this controlled operation of tube 10, voltage variations, which may be such as indicated by the waveform 26, are caused to appear across the primary winding 14 of transformer 16. These voltage variations 26 comprise periods of relatively constant negative voltage during the scanning intervals $t_1$, and sharp positive pulses during the retrace intervals $t_2$.

The secondary winding 28 of transformer 16 is wound in a direction opposite to that of the primary winding 14, so that when the upper end (in the drawing) of the primary winding is positive, the upper end of the secondary winding is negative. This causes the waveform 30 of the voltage appearing at the upper end of the secondary winding 28 to be reversed in polarity with respect to the voltage waveform 26, as shown.

A diode damper tube 32 has its anode connected to the upper end (in the drawing) of the secondary winding 28, or, in other words, to that end of the secondary winding 28 on which the negative excursions of voltage waveform 30 appear during the retrace intervals $t_2$. The cathode of diode 32 is connected to that end of the parallel resistance-condenser combination 18 which is joined to the primary winding 14 of coupling transformer 16. It will be noted that, as a result of such connections, the series combination of diode 32 and the resistance-condenser, or time constant, circuit 18 is shunted across both the secondary winding 28 of transformer 16 and the horizontal, or line, deflection coils 19 through all or a portion of two centering resistors 34 and 36, the function of which will be hereinafter described.

While the voltage variation 24 applied to the control electrode 20 of power tube 10 acts to cut off plate current in the tube at the beginning of retrace time $t_2$, the current in the secondary circuit of transformer 16 does not disappear instantaneously, because of the inherent distributed capacity across the secondary winding 28 (both directly on the secondary and that reflected through the transformer from the primary) and across the deflection coils 19. This distributed capacity is, at the beginning of retrace interval $t_2$, charged to a relatively low voltage.

The inductance of these elements 28 and 19, together with the distributed capacity thereacross, forms a tuned circuit in which high-frequency oscillations will be produced in the absence of the diode damper tube 32. The oscillations begin at the start of retrace interval $t_2$, and continue for substantially one-half cycle of the natural period of oscillation of the circuit. After one-quarter cycle, the current in the deflection coils 19 reverses, and the oscillation is stopped after one-half cycle near the negative current peak by reason of the diode damper tube 32. During the retrace time $t_2$, that is, during the half cycle of the natural period of oscillation of the secondary circuit, the current in both tubes 10 and 32 is completely blocked, the voltage across the deflection coils 19 and the transformer secondary 28 rising to a high peak value at one-quarter cycle when the current passes through zero. A new deflection cycle $t_1$ starts after the one-half cycle of free oscillation, at which time the voltage appearing across the deflection coils 19 and the transformer secondary 28 is maintained substantially uniform.

In order that linear deflection of the cathode ray beam be produced, it is necessary that the rate of change of the current flowing through the horizontal or line deflection coils 19 be maintained substantially constant during the scanning intervals $t_1$. The waveform of the voltage variations 24 applied to the control electrode 20 of power tube 10, as well as the bias potential of that tube, are such as to cause the plate current of tube 10 to increase after the beginning of the deflection cycle. The diode 32, however, begins to conduct immediately following the retrace intervals $t_2$, and operates to produce a decreasing plate current which supplements the plate current of power tube 10 to a substantially linear deflection current characteristic, this summation current representing that which actually flows through the deflection coils 19.

The bias on the diode damper tube 32 is a factor in determining the rate of current flow through the tube. This rate of current flow is selected so as to combine with the power tube current to result in a linear rate of change of deflection coil current. Consequently, the system should preferably include means for varying the bias on diode 32 so as to act as a linearity control.

The diode bias-adjusting means shown in Figure 1 comprises means for varying the value of the resistor 38 forming part of the parallel resistor-condenser combination 18. Since diode 32 is, in effect, a rectifier, current flowing through the diode 32 and the resistor-condenser combination 18 causes a charge to be built up on condenser 40 of the combination, the upper plate (in the drawing) of the condenser 40 being of positive potential.

By employing a time constant for resistor 38 and condenser 40 which is selected in accordance with the recurrence frequency of the control voltage variations 24, the charge thus developed on condenser 40 may be maintained relatively constant in value. The magnitude of this charge (as well as the deflection linearity) is controlled by the adjustable resistor 38.

In accordance with the present invention, the charge developed on condenser 40 is employed to increase, or "boost," the output of the horizontal, or line, power tube 10 (as well as the output of the vertical or field deflection power tube as will be later described) by raising the potential normally applied to the anode of tube 10 from the supply voltage source connected to the terminal 12.

As will be seen from Fig. 1 and as pointed out above, the anode of power tube 10 is connected to the supply voltage terminal 12 through the primary winding 14 of transformer 16 is series with the resistance-condenser combination 18. The voltage developed on condenser 40 of this resistance-condenser combination 18 is of such polarity as to add to the supply voltage, and hence the actual potential appearing on the anode of power tube 10 is substantially the sum of the supply voltage connected to terminal 12 and the voltage developed on condenser 40 due to the rectifying action of the diode damper tube 32. The power tube 10, therefore, operates with increased plate voltage to produce an increased power output.

It is apparent that the current rise in the anode circuit of power tube 10 during a scanning cycle is supplied in part by a partial discharge of capacitor 18, which is recharged by the diode 32 at the start of each scanning cycle.

In accordance with another feature of the present invention, the voltage developed on condenser 40 is employed to "boost" the output not only of the horizontal, or line, power tube, but of the vertical, or field, power tube as well. A vertical or field deflection power tube 42 which may, for example, be of the type known as the 6SN7, and which includes at least an anode, a cathode, and a control electrode, has its anode connected to the positive terminal 12 of the supply voltage source through the resistor-condenser combination 18 and the primary winding 44 of a vertical coupling transformer 46. A cathode-biasing resistor 48 provides the proper negative operating bias on the control electrode 50 of power tube 42 during operation of the system.

Power tube 42 is designed to supply cyclically varying current through transformer 46 to a pair of vertical, or field, deflection coils 52 when voltage variations, which may have a waveform such as indicated by the reference character 54, are applied to the control electrode 50 thereof.

The anode of the vertical, or field, deflection power output tube 42 is connected through the resistance-condenser combination 18 to the supply voltage terminal 12 in parallel with the anode of the horizontal, or line, power output tube 10. Hence, the anode of the vertical power tube 42 receives the same "boosted" voltage as does the anode of the horizontal power tube 10, resulting in an increased power output from the vertical power tube 42, and an increase in the peak amplitude of the current flowing through the vertical deflection coils 52.

The current requirement of the vertical power output tube 42 is small compared to that of the horizontal power output tube 10, and hence less discharge of capacitor 18 is occasioned during each cycle of vertical scanning than during each horizontal cycle. However, a larger value of capacitance must be provided for capacitor 18 when supplying vertical "boost" to avoid a visible "keystoning" (or modulation) of horizontal line length during each vertical scanning cycle.

The two centering resistors 34 and 36 are relatively low resistance, and are each provided with one fixed tap and one adjustable tap. Adjustment of the latter tap acts to control the amount of direct current from the supply source connected to terminal 12 which is permitted to flow through the deflection coils 19 and 52, respectively, and hence controls the centering of the cathode ray beam.

It should be noted that, although in the preceding description the voltage developed on condenser 40 is employed to increase, or "boost," the supply voltage to both the output power tubes so as to result in increased scanning power, nevertheless, if desired, the same output power may be maintained, with the voltage developed on condenser 40 being employed to reduce the required supply voltage approximately to the extent of the value of the charge on the condenser.

It should also be noted that the capacity of condenser 40 is chosen sufficiently large in the example given to feed both the horizontal power tube 10 and the vertical power tube 42. However, if "boosted" voltage for the vertical power tube 42 is not necessary or desirable under certain operating conditions, then the anode of the vertical power tube 42 may be connected through primary transformer winding 44 directly to the supply voltage terminal 12, or, in other words, connected to bypass the resistance-condenser combination 18. In such an event, the condenser 40 may be reduced in capacity, as it would then supply voltage only to the horizontal power tube 10.

Fig. 2 illustrates a cathode ray beam deflection circuit of the same type as that set forth in Fig. 1, but with the vertical, or field, deflection coils and their particular current supply means omitted.

Elements in Fig. 2 corresponding to those in Fig. 1 have been given the same reference numerals. A power supply filter unit 56, indicated within the broken lines, is adapted to supply, in the example to be given, a normal B+ output voltage of 280 volts, and a normal B— voltage of 105 volts.

Under one particular set of operating conditions, and with certain selected values of circuit components, approximately the following results may be obtained, these results being set forth to illustrate the manner in which power may be recovered from the cyclic reactive energy present in a load circuit, and employed for the purpose of recirculation.

If the voltage drop across the centering resistor 36 in Fig. 2 is 5 volts, then the voltage appearing at point 58 will be +280—5 or +275 volts. If the primary winding 14 of transformer 16 is wound with 500 turns, and if the secondary winding 28 is wound with 150 turns, then a control voltage variation 24 of a 15.75 kilocycle recurrence frequency applied to the control electrode 20 of power tube 10 will cause a charge of approximately 45 volts to be built up on condenser 40.

Since condenser 40 is in series with the source of positive supply voltage (which, in this instance, is +275 volts at point 58), then the voltage at point 60, which is available for application to the anode of power tube 10 through the primary winding 14, is approximately +275 volts+45 volts=+320 volts Thus the total anode voltage of power tube 10 relative to its grid has been "boosted" from 380 volts to 425 volts, or approximately 12 per cent.

As hereinabove stated, adjustment of the resistor 38 varies the magnitude of the average charge retained in condenser 40. These elements are preferably chosen to have a relatively long time constant which is obtainable, for example, if condenser 40 has a value in the order of 4 microfarads, and resistor 38 is a potentiometer having a maximum rating of 1000 ohms. However, since resistor 38 is also a linearity control, its adjustment is carried out for the purpose of obtaining a constant rate of change of scanning current flow through the horizontal deflection coils 19, and hence the highest degree of linearity of deflection of the cathode ray beam.

Having thus described my invention, I claim:

1. In a cathode ray beam deflecting system having reclaimable energy losses, the combination of a source of D.-C. potential, a transformer having primary and secondary windings, a time constant circuit, a power output tube having its anode connected to the positive terminal of said source of D.-C. potential through both the primary winding of said transformer and said time constant circuit, a cathode ray beam deflecting coil, a diode rectifier, and means for connecting said diode rectifier and said time constant circuit in series across both said cathode ray beam deflecting coil and the secondary winding of said transformer so that said diode will rectify the reactive energy cyclically developed in said deflecting system.

2. A cathode ray beam deflecting system according to claim 1, in which said time constant circuit comprises a parallel resistance-condenser combination, further including means for adjusting the value of the resistance of said resistance-condenser combination to thereby vary the charge developed on said condenser.

3. Apparatus for recovering a portion of the reclaimable power normally lost in a cathode ray beam deflecting system in which D.-C. power from a source of normally constant value is converted by means, including a first power output tube, into A.-C. power which is caused to flow through a horizontal cathode ray beam deflection coil, and in which D.-C. power from said source is also converted by means, including a second power output tube, into A.-C. power which is caused to flow through a vertical cathode ray beam deflection coil, the combination of a diode rectifier, a condenser connected in series with said diode rectifier, the series combination of said diode rectifier and said condenser being connected across said horizontal cathode ray beam deflecting coil so that said diode will rectify the reactive energy cyclically developed in said deflecting system, and means for applying the charge on said condenser to both said first power output tube and said second power output tube additively in series with said D.-C. power source.

4. Apparatus in accordance with claim 3, further comprising means for varying the amount of energy stored by said condenser.

5. Apparatus in accordance with claim 3, further comprising an adjustable impedance element shunting said condenser.

6. In a television system having reclaimable energy losses and employing a cathode ray tube, the combination of a source of D.-C. power, a circuit for converting D.-C. power from said source into A.-C. power of a substantially predetermined frequency, a line cathode ray beam deflecting coil for said cathode ray tube, said line cathode ray beam deflecting coil being connected to receive the A.-C. power output of said converting circuit, a diode, a condenser, means connecting said diode and said condenser in series across said line deflecting coil, a further circuit for converting D.-C. power from said source into A.-C. power of a different substantially predetermined frequency from that of the A.-C. power output of said first-mentioned converting circuit, a field cathode ray beam deflecting coil for said cathode ray tube, said field cathode ray beam deflecting coil being connected to receive the A.-C. power output of said further converting circuit and means for applying the charge on said condenser to both said converting circuits additively in series with said D.-C. power source.

7. A television system in accordance with claim 6, in which each of said converting circuits includes a power output tube, and in which said means for applying the charge on said condenser to both said converting circuits additively in series with said D.-C. power source includes a connection between said condenser and the anode of each of said power output tubes.

8. In a cathode ray beam deflecting system having reclaimable energy losses, the combination of a power output tube including an anode, a cathode ray beam deflection coil, a transformer coupling said power output tube to said deflection coil, one end of the secondary winding of said transformer being connected to one end of said deflection coil, a resistor element, means connecting the other end of the secondary winding of said transformer and the other end of said deflection coil respectively to points on said resistor element, a diode, a parallel resistance-capacitance circuit, means connecting said diode and said resistance-capacitance circuit in series between said one end of said deflection coil and one end of said resistor element, a source of D.-C. potential connected to the other end of said resistor element, and means for connecting the anode of said power output tube to said source of D.-C. potential through the primary winding of said transformer, said resistance-capacitance circuit, and said resistor element.

9. The combination of claim 8, further including a second power output tube including an anode, a second cathode ray beam deflection coil, a second transformer coupling said second power output tube to said second cathode ray beam deflection coil, one end of the secondary winding of said second transformer being connected to one end of said second deflection coil, a second resistor element connected between said parallel resistance-capacitance circuit and said first-mentioned resistor element, means connecting the other end of the secondary winding of said second transformer and the other end of said second deflection coil to points on said second resistor element, and means for connecting the anode of said second power output tube through the primary winding of said second transformer to said resistance-capacitance circuit in parallel with the anode of said first-mentioned power output tube.

CHARLES EDWARD TORSCH.

REFERENCES CITED

The following references are of record in the file of this patent:

UNITED STATES PATENTS

| Number | Name | Date |
| --- | --- | --- |
| 2,212,217 | White et al. | Aug. 20, 1940 |